No. 673,143. Patented Apr. 30, 1901.
F. SETTE.
CHEESE MAKER'S MILK PROVING APPARATUS.
(Application filed Oct. 14, 1897.)
(No Model.)

Witnesses:
Geo. W. Young.
N. E. Oliphant.

Inventor:
Frederick Sette
By H. G. Underwood
Attorney.

UNITED STATES PATENT OFFICE.

FREDERICK SETTE, OF IRONRIDGE, WISCONSIN.

CHEESE-MAKER'S MILK-PROVING APPARATUS.

SPECIFICATION forming part of Letters Patent No. 673,143, dated April 30, 1901.

Application filed October 14, 1897. Serial No. 655,145. (No model.)

*To all whom it may concern:*

Be it known that I, FREDERICK SETTE, a citizen of the United States, and a resident of Ironridge, in the county of Dodge and State of Wisconsin, have invented certain new and useful Improvements in Cheese-Makers' Milk-Proving Apparatus; and I do hereby declare that the following is a full, clear, and exact description thereof.

In the manufacture of cheese it is customary at factories to mix milk obtained from various dairies, and if any of the milk be adulterated or tainted the cheese will be below standard quantity or quality, it frequently happening that an entire batch of cheese is low grade because some of the milk employed in its manufacture was not right in the matter of purity or sweetness through no fault of the cheese-maker. It is also possible that cheese will be of less than expected quantity or quality notwithstanding the fact that all the milk employed in its production may have stood well-known tests as to purity, sweetness, and constituents.

In order to determine quantity and quality of cheese that may be produced from milk of any dairy, it is necessary to subject a separate quantity of this milk to the whole process of cheese-making; and the object of my invention is to provide an apparatus by which separate equal measures of milk from several dairies may be put through the cheese-making process at the same time under exactly the same conditions of temperature and agitation, whereby positive determination and fair comparison may be had as to quantity and quality of the several products, the cheese-maker being thus enabled to discover who is furnishing him with poor milk.

The milk-proving apparatus in accordance with my invention comprises a single heating-tank of any suitable construction, a plurality of uniform-capacity receptacles in the tank, an agitator in each receptacle, and suitable gearing for simultaneous rotation of all the agitators at a uniform rate of speed, as will be hereinafter more particularly set forth with reference to the accompanying drawings and subsequently claimed.

Figure 1:
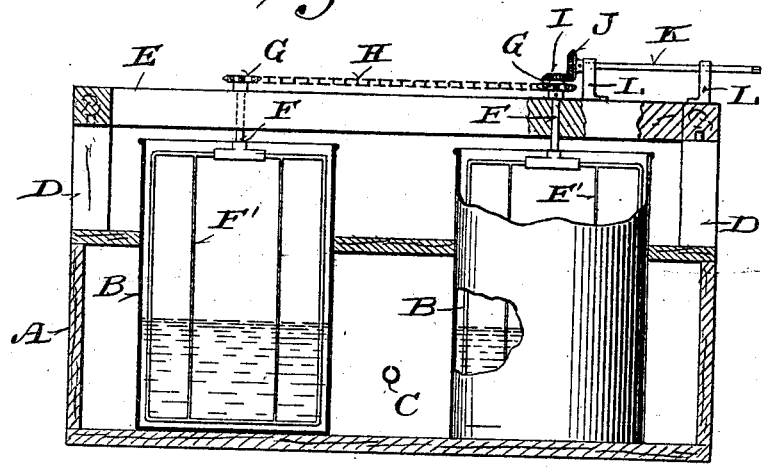
Figure 2:
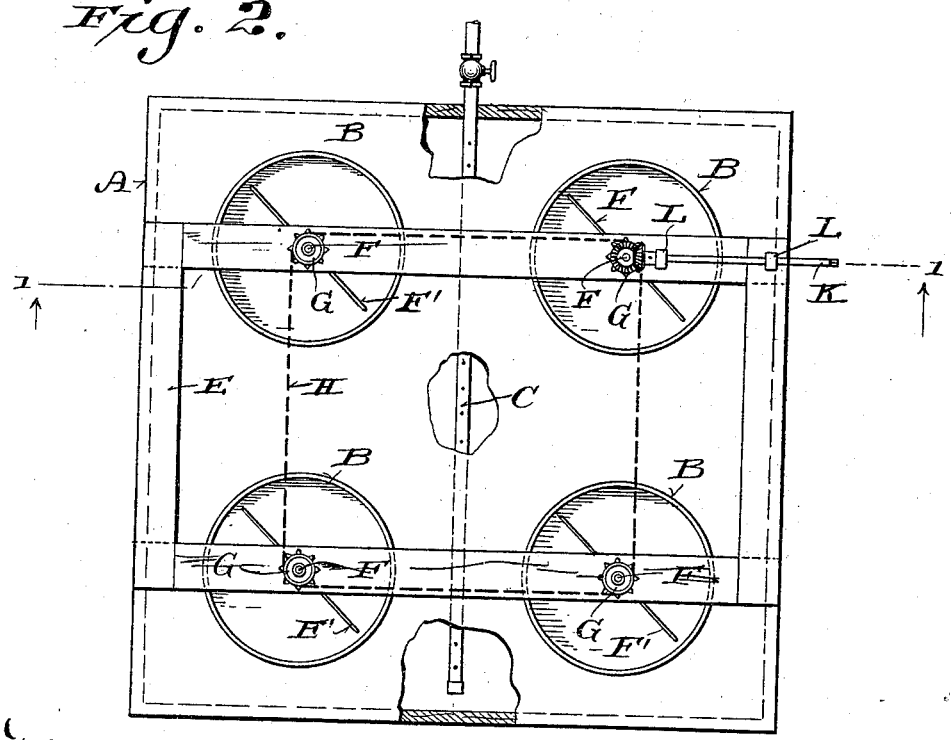

Figure 1 of the drawings represents a partly-sectional view of my milk-proving apparatus and is indicated by line 1 1 in the succeeding figure. Fig. 2 of said drawings represents a plan view of the aforesaid apparatus, partly broken away.

Referring by letter to the drawings, A represents a tank having a cover provided with a plurality of circular apertures. Cylindrical milk-receptacles B of uniform capacity are set in the tank through its top apertures, the diameter of these apertures and receptacles being approximately equal, as a matter of preference, especially when free steam is utilized as a heating medium for the contents of said receptacles.

It is to be understood that each receptacle B has very small capacity in proportion to that of an ordinary cheese-vat, and it has been demonstrated in practice that receptacles proportioned for the treatment of fifty pounds of milk, as a maximum sample, in each will be satisfactory for the purpose of carrying out the object of my invention.

A valve-controlled steam-pipe C is shown extended into the tank A and provided with a series of jets, so as to diffuse free steam in said tank about the receptacles, each of the latter and its contents being thus subjected to the same degree of temperature. The tank is shown provided with supports D, and a detachable frame E is shown at rest on the supports. In practice sheave-supported flexible runners may be utilized to facilitate handling of the frame. A series of spindles F have rotation in the frame, and all of the spindles are driven at the same time at the same rate of speed by suitable gearing. As herein shown, each spindle may be provided with a sprocket-wheel G, engaging a link belt H, common to all the sprocket-wheels, and a bevel gear-wheel I is shown on one of the spindles in mesh with a similar wheel J on a drive-shaft K, supported in bearings L upon the aforesaid frame. Each spindle F and a rack F' depending therefrom constitute an agitator for the engagement of one of the receptacles B above specified.

In practice equal measures of milk from different dairies are put in the uniform-capacity receptacles, the latter being arbitrarily designated by numbers or otherwise. For instance, milk from one dairy is put in receptacle No. 1, milk from another dairy in receptacle No. 2, and so on, whereby the milk of each dairy is isolated from that of others in the proving apparatus. The several measures of milk are now subjected to the same degree of heat in the single tank for a time and then properly curdled, after which the curds are cut and the agitators placed in said receptacles, all of these agitators being then rotated for the same length of time at the same rate of speed, said curds being kept at the same temperature in the several receptacles. Upon subsequent removal of the agitators from the receptacles the contents of the latter are strained to get rid of the whey and the cheese product from each receptacle is placed in a separate mold and cured, the several molds or their contents being arbitrarily distinguished in any suitable manner or by any suitable means, so that the cheese-maker may at any time readily and unmistakably determine quantity and quality of cheese obtained from any sample of milk treated in the proving apparatus.

The dimensions of the heating-tank correspond with the number of the receptacles and corresponding agitators it is desired to employ. Hence the proving apparatus in accordance with my invention may be made in sizes according to the requirements of various cheese-makers.

From the foregoing it will be understood that I provide a simple, economical, and effective means whereby a cheese-maker may at any time prove the quantity and quality of cheese obtainable from milk of different dairies, thus enabling him to protect himself against imposition or carelessness on the part of dairymen.

The proving apparatus herein set forth is portable, and therefore it may be readily transferred from one cheese-factory to another more or less distant when a milk-proving test is desirable, it being understood that only a limited sample amount of cheese can be made in any one of the receptacles constituting parts of said apparatus and that equal measures of milk from different dairies must be separately subjected to the cheese-making process at the same time under exactly the same conditions in order to obtain a fair comparison as to quantity and quality of the products, and as it has not heretofore been practical to accomplish this result in a cheese-factory the merit of my aforesaid apparatus as an adjunct to such a factory is apparent, even though it may not be necessary or desirable to make a test similar to that described except at rare intervals.

Having thus described my invention, what I claim as new, and desire to secure by Letters Patent, is—

A milk-proving apparatus for cheese-makers, the same comprising a covered tank, a valve-controlled steam-pipe extended into the tank and provided with a series of jets, a plurality of uniform-capacity receptacles set in the tank through top apertures of the same, a removable agitator arranged to have rotation in each receptacle, and gearing operative in conjunction with the several agitators to drive each simultaneous with all the others at a uniform rate of speed; whereby equal measures of milk from various dairies may be isolated from each other and subjected to a cheese-making process at the same time under the same conditions of high temperature and agitation.

In testimony that I claim the foregoing I have hereunto set my hand, at Hartford, in the county of Washington and State of Wisconsin, in the presence of two witnesses.

FREDERICK SETTE.

Witnesses:
W. R. AMIDON,
DWIGHT JACKSON.